United States Patent
Sun et al.

(10) Patent No.: US 8,098,620 B2
(45) Date of Patent: Jan. 17, 2012

(54) METHOD FOR STATUS REPORTING IN WIRELESS COMMUNICATION SYSTEMS WHEN ONE-TIME ALLOCATED RESOURCE IS INSUFFICENT

(75) Inventors: Yishen Sun, Libertyville, IL (US); Ravi Kuchibhotla, Gurnee, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 528 days.

(21) Appl. No.: 12/358,453

(22) Filed: Jan. 23, 2009

(65) Prior Publication Data

US 2009/0232069 A1    Sep. 17, 2009

Related U.S. Application Data

(60) Provisional application No. 61/035,981, filed on Mar. 12, 2008.

(51) Int. Cl.
*H04L 12/26* (2006.01)
(52) U.S. Cl. .................................................. 370/328
(58) Field of Classification Search ............... 370/310.2, 370/314, 328, 338, 341, 342, 343, 345, 347; 455/434, 435.3, 450, 515; 709/200, 225, 709/230
See application file for complete search history.

(56) References Cited

U.S. PATENT DOCUMENTS

| | | | |
|---|---|---|---|
| 7,826,398 B2 * | 11/2010 | Monier | 370/255 |
| 2008/0068989 A1 * | 3/2008 | Wyk et al. | 370/229 |
| 2008/0068996 A1 * | 3/2008 | Clave et al. | 370/230.1 |

OTHER PUBLICATIONS

3GPP TS 36.322 V8.0.0 (Dec. 2007) 35 Pages.
3GPP TSG-RAN WG2; R2-073539; Athens, Greece; Aug. 20-24, 2007; 3 Pages.
3GPP TSG-RAN WG2 #61; R2-080905; Feb. 11-15, 2008; Sorrento, Italy; 2 Pages.
3GPP TSG RAN WG2 #61; R2-080926; Feb. 11-15, 2008; Sorrento, Italy; 4 Pages.

* cited by examiner

*Primary Examiner* — Raj Jain
(74) *Attorney, Agent, or Firm* — Roland K. Bowler, II

(57) ABSTRACT

A wireless communication terminal includes a controller configured to prompt a transceiver to transmit a partial status report accommodated by a radio resource available to the terminal. The partial status report includes a sub-set of complete acknowledgement information that is associated with set of protocol data units, wherein the partial status report omits a portion of the complete acknowledgement information. The partial status reporting includes an indication that the partial status report omits the portion of the complete acknowledgement information.

15 Claims, 3 Drawing Sheets

METHOD FOR STATUS REPORTING IN WIRELESS COMMUNICATION SYSTEMS WHEN ONE-TIME ALLOCATED RESOURCE IS INSUFFICIENT

FIELD OF THE DISCLOSURE

The present disclosure relates generally to wireless communications and more particularly to status reporting when a one-time allocated resource is insufficient.

BACKGROUND

3GPP is currently in the process of defining the core specifications for a Radio Link Control (RLC) protocol layer responsible for reliably transferring data packets using protocol data units (PDUs). For LTE/EUTRA, a baseline status PDU format has been agreed upon consisting of a cumulative ACK_SN and/or a list of NACK_SNs as illustrated in prior art FIG. 4. Under the current baseline status PDU format, the sender of a data PDU assumes by default that a PDU/PDU segment with SN smaller than ACK_SN is received successfully if it is not NACKed explicitly through the list of NACK_SNs. However, if the size of the status PDU prepared according to the baseline format is larger than the available bandwidth allocated by Medium Access Control (MAC), the sender of the data PDU may clear the transmission buffer prematurely, which is problematic.

The scenario where the entire status PDU is greater than the available resources is more likely to occur when the Medium Access Control (MAC) Transmission Block (TB) is relatively small. In the baseline status PDU format of prior art FIG. 4, the D/C, CPT, ACK_SN, and E1 fields have taken 15 bits, and these fields are present in every status PDU. For the remaining list of NACKs, a PDU NACK consumes 12 bits (NACK_SN, E1 and E2), and a PDU segment NACK consumes 42 bits (NACK_SN, E1, E2, SOstart and SOend).

The RLC status PDU is prepared when a transmission opportunity is informed by MAC. Since the size of the prepared RLC status PDU is independent of the MAC allocated resource, it is possible that the original status PDU is larger than the available bandwidth, especially when the channel condition is poor and the sender has to re-segment PDUs during retransmission, which leads to NACKing PDU segments.

For a MAC TB size of 88 bits, which is the smallest size, only 72 bits are available for RLC PDU(s) because the MAC header uses 2 bytes. When transmitting a status PDU, after using 15 bits for the D/C, CPT, ACK_SN, E1 fields, the remaining (72−15) 57 bits are only sufficient to NACK 1 PDU segment plus 1 PDU, or up to 4 PDUs. For a 104 bit MAC TB, which is next to the smallest TB size, 88 bits are available for RLC PDU. These bits can only NACK 1 PDU segment plus 2 PDUs, or up to 6 PDUs. Similarly, for a 136 bit MAC TB, 120 bits are available for RLC PDU. These bits can only NACK 2 PDU segments plus 1 PDU or 1 PDU segment plus 5 PDUs or up to 8 PDUs.

Thus when the original status PDU is larger than the available bandwidth, the receiver of the status PDU may interpret the status report incorrectly. For example, if the transmitter sends an RLC PDU of sequence number (SN) 1 through 13, the PDUs of SNs {1, 3, 5, 6, 7, 9, 11, 12} are missing at the receiver side, as depicted in FIG. 2. In 3GPP TS 36.322 v8.0.0, "Radio Link Control (RLC) protocol specification (Release 8)", ACK_SN must be set as 13 because VR(MS)= 13. If only SN=1, 3, 5, 6, 7 and 9 are included in the NACKs list of the status report, the data PDU sender will assume that SN=11 and 12 have been received correctly and clear the buffer accordingly. Actually NACKing any 6 out of the missing 8 PDUs will implicitly acknowledge the receipt of the other two remaining PDUs.

The example above considers only PDU NACKs to simplify the description. The problem is more likely to involve PDU segment NACKs, because they use more bits in a report. According to the baseline status PDU format, one cumulative ACK_SN and eight NACK_SNs should be included in the status PDU. However, if the available MAC resource is only able to accommodate 6 NACK_SNs, as is the case if the next to smallest MAC TB is used (104 bits), the original status PDU must be truncated to fit into the MAC allocation.

The various aspects, features and advantages of the disclosure will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
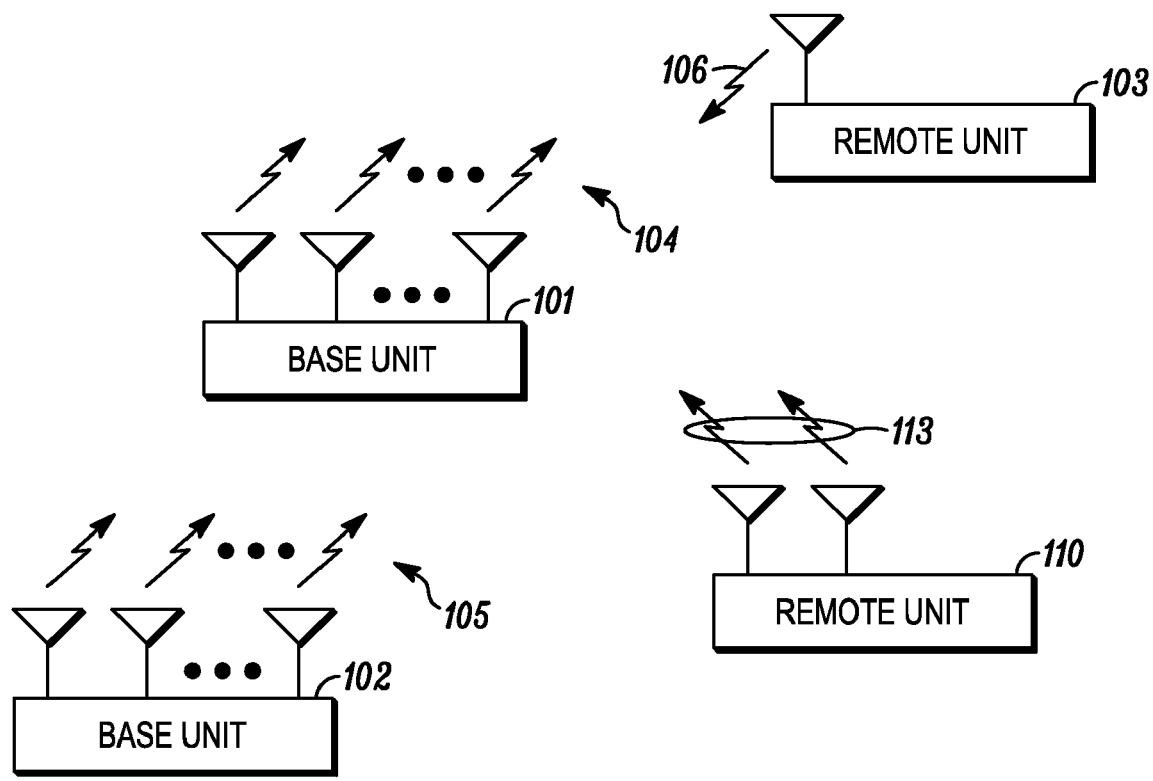
FIG. 1 illustrates a wireless communication system.

In FIG. 1, a wireless communication system 100 comprises one or more fixed base infrastructure units forming a network distributed over a geographical region. The base unit may also be referred to as an access point, access terminal, base, base station, Node-B, eNode-B or by other terminology used in the art. In FIG. 1, the one or more base units 101 and 102 serve a number of remote units 103 and 110 within a serving area, for example, a cell or a cell sector. The remote units may be fixed units or mobile terminals. The remote units may also be referred to as subscriber units, mobiles, mobile stations, users, terminals, subscriber stations, user equipment (UE), terminals, or by other terminology used in the art.

Generally, the base units 101 and 102 transmit downlink communication signals 104 and 105 to serve remote units in the time and/or frequency domain. The remote units 103 and 110 communicate with the one or more base units via uplink communication signals 106 and 113. The one or more base units may comprise one or more transmitters and one or more receivers for downlink and uplink transmissions. The remote units may also comprise one or more transmitters and one or more receivers.

In one implementation, the wireless communication system is compliant with the developing Long Term Evolution (LTE) of the 3GPP Universal Mobile Telecommunications System (UMTS) protocol wherein the base station transmits using an orthogonal frequency division multiplexing (OFDM) modulation scheme on the downlink and the user terminals transmit on the uplink using a single carrier frequency division multiple access (SC-FDMA) scheme. More generally, however, the wireless communication system may implement some other open or proprietary communication protocol. The present disclosure is not intended to be limited to the implementation of any particular wireless communication system architecture or protocol and is generally applicable to wireless communication systems and protocols where the mobile terminal transmits acknowledgement information indicating the reception and/or non-reception of protocol data units (PDUs) to a PDU origination entity.

As used herein, acknowledgement information includes an acknowledgement of receipt of a PDU (ACK) and/or an acknowledgment of non-receipt of a PDU, also referred to as negative acknowledgement (NAK or NACK). As noted, in some circumstances the status PDU, also referred to as a PDU status report or status report, including a complete set of acknowledgement information for an associated set of PDUs is larger than the available resource on which the terminal must transmit the report.

According to one aspect of the disclosure, the terminal generates and transmits a partial, or truncated, status report that is accommodated by a radio resource that is unable to accommodate a status report including a complete set of acknowledgement information for an associated set of PDUs. Such a status report is also referred to herein as a baseline status report. In some embodiments, the truncated status report is transmitted only after a determination is made that a radio resource allocated or otherwise available to the terminal is insufficient to accommodate transmission of a status report including a complete set of acknowledgement information for an associated set of PDUs. Such a determination would be made by the terminal transmitting the status report. In other implementations, the terminal transmits a truncated status report without first making such a determination.

The terminal generally includes a transceiver communicably coupled to controller that is configured to prompt the transceiver to transmit a partial status report accommodated by a radio resource available to the terminal, wherein the partial status report includes a sub-set of complete acknowledgement information. The complete set of acknowledgement information is for an associated set of protocol data units wherein the partial status report omits a portion of the complete acknowledgement information. The omitted portion of the complete acknowledgement information may be transmitted in one or more subsequent status reports, which may or may not be truncated. The controller is preferably a digital device controlled and configured by firmware or software.

In one embodiment, the truncated PDU status report includes a first sub-set of the complete acknowledgement information for the associated set of PDUs, wherein truncated status report omits a portion of the complete acknowledgement information. Thereafter, the terminal transmits a subsequent truncated status report accommodated in a subsequently allocated radio resource. The subsequent truncated status report includes at least a portion of the complete acknowledgement information omitted form the previous truncated status report. Any remaining unsent portions of the status report may be transmitted in subsequent status reports.

In some wireless communication systems, the scheduling entity, which is typically part of a base station, that allocates radio resources to the wireless communication terminal will increase the size of subsequent resource allocations to the terminal from which a truncated status report is received. Since the receipt of the partial status report by the base station is an indication that the terminal requires additional resources.

In some implementations, the terminal transmitting the truncated status report provides an indication that the truncated status report is truncated. The indication may be provided in the truncated status report. Without such an indication, the entity receiving the truncated status report would not know that the status report is incomplete, and more particularly that the acknowledgement information provided in the status report is incomplete.

In one embodiment where status report indicates the status report format, the terminal provides an explicit indication that the status report is truncated or partial. According to this embodiment, a flag within the status report is set to indicate the incomplete nature of the status report. In one implementation, the flag is located in the header portion of the status report, for example, in the Control PDU Type (CPT) field of the truncated status report. In one embodiment, when the Flag=0, the status report is interpreted in a baseline status report and when the Flag=1, the status report is interpreted as a truncated status report, which means that the status report only ACKed PDU of ACK_SN and NACKed those PDU/PDU segments listed and no assumptions should be made about the receiving status of other PDU/PDU segments. Alternatively, the flag bit settings could be complementary. The extra flag bit does not result in an extra byte compared to the baseline status report for the following reason. In the baseline status report, the (D/C, CPT, ACK_SN, E1) fields use a total of 15 bits, which is an odd number. Further, these fields are present in every status PDU. For the remaining list of NACKs, a PDU NACK requires 12 bits (NACK_SN, E1, E2) which is an even number, and a PDU segment NACK requires 42 bits (NACK_SN, E1, E2, SOstart, SOend) which is also an even number. The total number of bits (15+12+42) is an odd number, which will not be a multiple of 8. Thus the extra flag bit does not result in an additional byte.

In another embodiment where the status report indicates the status report format, the indication that the status report is truncated is implicit. According to this embodiment, setting the ACK_SN (corresponding to the reference PDU) equal to a NACK_SN included in the report implicitly indicates a partial status report. This approach is feasible because in a complete or baseline status report (as versus truncated one), the same PDU or PDU segment could not be both ACKed and NACKed at the same time. In this embodiment, the status report includes reference PDU_SN indicating a reference point in a sequence of PDUs identified in the status report. The status report also includes a first PDU_SN indicating non-reception of a corresponding PDU, wherein the reference PDU_SNs is set equal to the first PDU_SN. In one implementation, the reference PDU_SN is first in a sequence of at least two PDU_SNs in the status report. Thus when the reference ACK_SN equals the highest NACK_SN in the NACK list, the status report is interpreted as a partial status report. This means that the status report only ACKed PDUs up to but not including the reference ACK_SN, and that the status report NACKed only those PDU/PDU segments listed.

Figures 2, 3:
FIG. 2 illustrates the PDUs of SNs {1, 3, 5, 6, 7, 9, 11, 12} are missing at the receiver side when the transmitter sends an RLC PDU of sequence number (SN) 1 through 13.
FIG. 3 illustrates a sequence list field in a status PDU.
Figure 4:
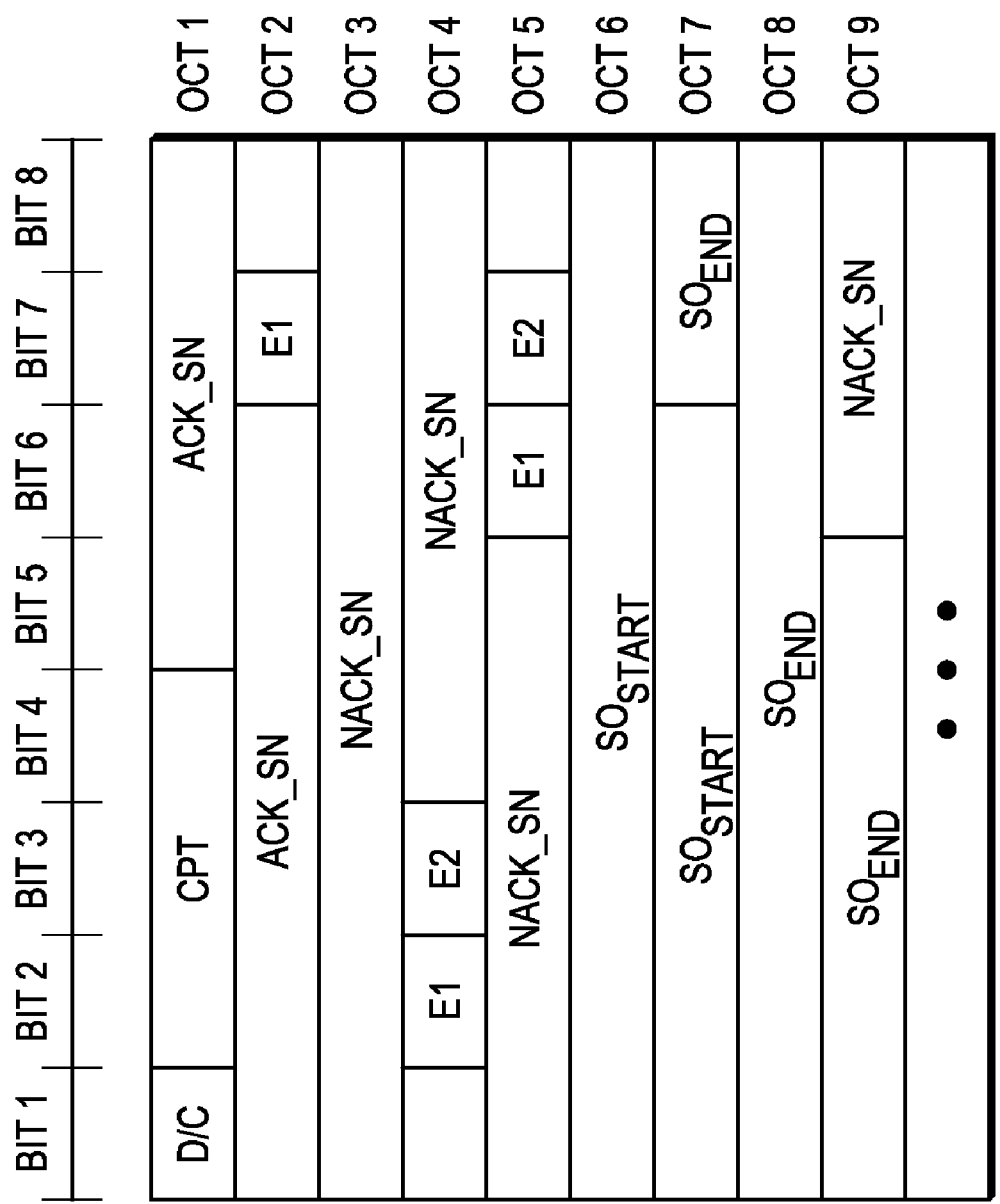
FIG. 4 is a prior art illustration of a cumulative ACK_SN and/or a list of NACK_SNs.

In FIG. 2, the original status PDU {ACK_SN=14, NACK_SN=1, 3, 5, 6, 7, 9, 11, 12} can be sent in multiple parts as follows. In one embodiment, the first partial status report includes {ACK_SN=9, NACK_SN=1, 3, 5, 6, 7, 9} and the second partial status report includes {ACK_SN=12, NACK_SN=11, 12}. The first partial status report implicitly indicates that the first report is incomplete by virtue of the ACK_SN=9 set equal to NAK_SN=9. Similarly, the second partial status report implicitly indicates that the second report is incomplete by virtue of the ACK_SN=12 set equal to NAK_SN=12. In another embodiment, the first status report is a baseline status report that includes {ACK_SN=11, NACK_SN=1, 3, 5, 6, 7, 9} and the second status report is a partial report that includes {ACK_SN=12, NACK_SN=11, 12}. Under the second embodiment, one baseline status report and one partial status report are sent covering all ACKs and NACKs of the original complete PDU. The second embodiment is more efficient than the first embodiment in ACKing PDUs when necessary, as shown in the example.

The implicit indicator approach has advantages similar to those of the explicit indicator solution discussed above, such as the baseline status report can be transmitted in several portions if needed without causing any ambiguity, and only a single status PDU format is required. The advantage of the implicit indicator over the explicit solution is that there is no need for an additional flag bit in the header of the status report. A disadvantage of the implicit indicator solution is that the ACK_SN no longer reflects the updated value of VR(MS) at the receiver, which may result in expiration of the poll retransmission timer under certain conditions.

Setting the ACK_SN equal to a NACK_SN is only an exemplary implicit indicator solution. Alternative implicit indicator solutions are also possible, depending on the ultimate format of the baseline status report. In a first alternative embodiment, ACK_SN is set equal to NACK_SN, and the E2 bit of the associated NACK_SN is set equal to 1, which means no segment offset pairs follow. This alternative embodiment is used in case it is useful to NACK PDU segments with SN equal to ACK_SN in a baseline status report. In a second alternative embodiment, ACK_SN is set equal to NACK_SN, and ACK_SO is set equal to NACK_SOend+1. ACK_SO is defined as the segment offset of the PDU-segment being ACKed. This allows ACKing of PDU/PDU segment up to segment offset level. That is, if there is an extension of the status report format, which allows acknowledgement of PDU/PDU segments up to but not including (ACK_SN, ACK_SO) bytes, the second alternative embodiment would support it. This extended format is possible by adding one E2 bit after ACK_SN, and the E2 bit is set to one to indicate the existence of ACK_SO field.

If the available resource is not sufficient to list all non-received PDUs, the truncated status report could NACK PDUs in ascending order starting from the PDU closest to the lower edge of the receiving window, so that the PDU with smaller SN will be retransmitted first and the transmitter can schedule PDUs with higher sequence numbers as soon as possible. For the example illustrated in FIG. 2, the truncated status report will be {ACK_SN=11, NACK_SN=1, 3, 5, 6, 7, 9}. By changing the ACK_SN reference or anchor from the first non-received PDU that is also not detected as missing for example, to the first in sequence non-received PDU that is detected as missing, the data PDU sender will not assume that PDU with SN=11 and SN=12 are received.

In one embodiment, a reference PDU_SN placed first in the sequence of at least two PDU_SNs, wherein the reference PDU_SN corresponds to a first in sequence PDU not received and detected as missing following the PDU_SN. In one implementation, under these circumstances, the partial status report indicates non-reception of a first PDU with a corresponding reference PDU_SN and also indicates non-reception of a second PDU with a corresponding PDU_SN.

The misinterpretation of the PDU status report is attributable to the fact that the baseline PDU status report format acknowledges cumulatively all previous PDUs unless explicitly NACKed, i.e., the reporting range is SN≦ACK_SN. One possible solution then is to report the receiving status piecewise, i.e., over a defined range SNstart≦SN≦SNend. According to this alternative embodiment, the baseline status report is modified to include a reference field indicating a sequence number of a first PDU, and a bit map indicating acknowledgement information for a sequence of PDUs selected relative to the first PDU. In addition the status report may also be now truncated in order to fit the available resource. The bitmap reports both receiving and missing PDUs, and the format is quite similar to that in Release 7, only that the FSN field size is changed to 10 bits and the LENGTH field indicates the size of the bitmap in bits instead of octets.

The bitmap does not assume the receiving status of any PDUs other than those indicated explicitly in the bitmap field. The bitmap would not be appropriate for RLC PDU segment ACK/NACK, since PDU segments are identified using both a sequence number and byte offset. Therefore every byte of the original PDU must be represented by one bit in the bitmap in order to avoid ambiguity when using a bitmap, which is not efficient.

According to a related aspect of the disclosure, the terminal transmits an offset information status report corresponding to the modified status report. The offset information status report identifies at least one PDU segment not received by the terminal, wherein the offset information comprises a sequence number and a PDU segment identity, for example, an offset, for a corresponding PDU. FIG. 3 illustrates an offset information status report to report missing RLC PDU segments only. The SLIST Super-Field consists of a type identifier field (SLIST) to indicate offset information status report, and a list of (NACK_SN, $SO_{start}$, $SO_{end}$) triplets for missing segments.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication terminal, the method comprising:
receiving a radio resource allocation;
determining that the allocated radio resource is insufficient to accommodate transmission of a status report,
the status report including a complete set of acknowledgement information for an associated set of protocol data units (PDUs);
transmitting a truncated status report accommodated by the allocated radio resource,
the truncated status report includes a first sub-set of the complete acknowledgement information for the associated set of PDUs, the truncated status report omits a portion of the complete acknowledgement information.

2. The method of claim 1, providing an indication, in the truncated status report, that the truncated status report omits a portion of the complete acknowledgement information.

3. The method of claim 2,
including a reference PDU_SN in the truncated status report, the reference PDU_SN is first in a sequence of at least two PDU_SNs in the truncated status report, and
indicating non-reception of first PDU with a corresponding first PDU_SN, wherein the reference PDU_SN is set equal to the first PDU_SN.

4. The method of claim 2, indicating that the truncated status report omits a portion of the complete acknowledgement information using a flag in the truncated status report.

5. The method of claim 1,
receiving a subsequent radio resource allocation;
transmitting a subsequent truncated status report accommodated by the subsequent allocated radio resource,
the subsequent truncated status report includes at least a portion of the omitted portion of the complete acknowledgement information.

6. The method of claim 1,
indicating non-reception of a first PDU with a corresponding reference PDU_SN and indicating non-reception of a second PDU with a corresponding PDU_SN,
the reference PDU_SN placed first in the sequence of at least two PDU_SNs,
the reference PDU_SN corresponds to a first in sequence PDU not received and detected as missing following the PDU_SN.

7. A wireless communication terminal, comprising:
a transceiver;
a controller communicably coupled to the transceiver,
the controller configured to prompt the transceiver to transmit a partial status report accommodated by a radio resource available to the terminal,
the partial status report includes a sub-set of complete acknowledgement information, the complete set of acknowledgement information is for an associated set of protocol data units, the partial status report omits a portion of the complete acknowledgement information.

8. The terminal of claim 7, the controller configured to prompt transmission of the partial status report only if the radio resource is insufficient to accommodate transmission of a baseline status report including complete acknowledgement information.

9. The terminal of claim 7, the partial status reporting including an indication that the partial status report omits the portion of the complete acknowledgement information.

10. The terminal of claim 9,
the partial status report includes a reference PDU_SN that is first in a sequence of at least two PDU_SNs in the partial status report, and
the partial status report includes an indication of non-reception of a first PDU with a corresponding first PDU_SN, wherein the reference PDU_SN is set equal to the first PDU_SN.

11. The terminal of claim 9, the partial status report includes a flag indicating that the truncated status report omits the portion of the complete acknowledgement information.

12. The terminal of claim 7,
the controller configured to transmit a subsequent truncated status report accommodated by a subsequent radio resource available to the terminal,
the subsequent truncated status report includes at least a portion of the omitted portion of the complete acknowledgement information.

13. The terminal of claim 7,
the partial status report including an indication of non-reception of a first PDU with a corresponding reference PDU_SN and an indication of non-reception of a second PDU with a corresponding PDU_SN,
the reference PDU_SN placed first in a sequence of at least two PDU_SNs, the reference PDU_SN corresponds to a first in sequence PDU not received and detected as missing following the PDU_SN.

14. A method in a wireless communication terminal, the method comprising:
receiving a radio resource allocation;
transmitting a modified status report accommodated by the allocated radio resource only if the allocated radio resource is insufficient to accommodate transmission of a standard status report;
the modified status report includes a reference field indicating a sequence number of a first PDU, the modified status report includes a bit map indicating acknowledgement information for a sequence of PDUs selected relative to the first PDU.

15. The method of claim 14 further comprising transmitting an offset information report corresponding to the modified status report, the offset information report identifying at least one PDU segment not received by the terminal, the offset information comprising a sequence number and a PDU segment identity for a corresponding PDU.

* * * * *